(12) United States Patent
Paik et al.

(10) Patent No.: US 11,354,918 B2
(45) Date of Patent: Jun. 7, 2022

(54) ELECTRONIC DEVICE FOR RECOGNIZING VISUAL STIMULUS BASED ON SPONTANEOUS SELECTIVE NEURAL RESPONSE OF DEEP ARTIFICIAL NEURAL NETWORK AND OPERATING METHOD THEREOF

(71) Applicant: Korea Advanced Institute Of Science And Technology, Daejeon (KR)

(72) Inventors: Se-Bum Paik, Daejeon (KR); Gwangsu Kim, Daejeon (KR); Jaeson Jang, Daejeon (KR); Seungdae Baek, Daejeon (KR); Min Song, Daejeon (KR)

(73) Assignee: Korea Advanced Institute Of Science And Technology, Daejeon (KR)

( * ) Notice: Subject to any disclaimer, the term of this patent is extended or adjusted under 35 U.S.C. 154(b) by 177 days.

(21) Appl. No.: 17/000,887

(22) Filed: Aug. 24, 2020

(65) Prior Publication Data
US 2021/0287059 A1    Sep. 16, 2021

(30) Foreign Application Priority Data
Mar. 12, 2020 (KR) .......................... 10-2020-0030553

(51) Int. Cl.
*G06V 30/194* (2022.01)
*G06N 20/10* (2019.01)
*G06N 3/04* (2006.01)
*G06N 3/08* (2006.01)

(52) U.S. Cl.
CPC ......... *G06V 30/194* (2022.01); *G06N 3/0454* (2013.01); *G06N 3/08* (2013.01); *G06N 20/10* (2019.01)

(58) Field of Classification Search
CPC .... G06V 30/194; G06V 10/454; G06V 10/82; G06N 3/0454; G06N 3/08; G06N 20/10; G06K 9/6256; G06K 9/6271; A61B 5/378
See application file for complete search history.

(56) References Cited

U.S. PATENT DOCUMENTS

2020/0058126 A1* 2/2020 Wang .................. G06K 9/6262

OTHER PUBLICATIONS

Kim, G. et al., "Spontaneous generation of innate number sense in untrained deep neural networks," Korea Advanced Institute of Science and Technology, Nov. 29, 2019, doi: http://dx.doi.org/10.1101/857482 (24 pages).

* cited by examiner

*Primary Examiner* — Christopher Wait
(74) *Attorney, Agent, or Firm* — Nixon Peabody LLP

(57) ABSTRACT

Various example embodiments relate to an electronic device for recognizing visual stimulus based on spontaneous selective neural response of deep artificial neural network and an operating method thereof, and may configured to measure a response of an untrained randomly-initialized neural network for an input image, and recognize at least one visual stimulus from the input image, based on the measured response.

20 Claims, 10 Drawing Sheets

ELECTRONIC DEVICE FOR RECOGNIZING VISUAL STIMULUS BASED ON SPONTANEOUS SELECTIVE NEURAL RESPONSE OF DEEP ARTIFICIAL NEURAL NETWORK AND OPERATING METHOD THEREOF

This application claims the priority benefit of Korean Patent Application No. 10-2020-0030553, filed on Mar. 12, 2020, Korean Intellectual Property Office, the disclosure of which is incorporated herein by reference.

BACKGROUND

1. Field of the Invention

The following example embodiments relate to an electronic device for recognizing visual stimulus based on spontaneous selective neural response of deep artificial neural network and an operating method thereof.

2. Description of Related Art

Generally, a training process for a deep artificial neural network has been considered as an essential process in the overall field of implementing artificial intelligence. In particular, a method of implementing a visual cognitive function by using the training of the deep artificial neural network has been most actively studied in the artificial intelligence field due to its various possibilities. Of these, number sense, which is a function that roughly estimates the number of objects given to a visual image without accurately counting, is a function serving a key basis for processing complex visual information for various images.

Previously, there were various methods for estimating the numerosity of visual stimulus given to a visual image by using a deep artificial neural network, but there was a common feature that it needs a training process for training the deep artificial neural network by using a lot of data. Therefore, although a method for reducing computing resources and time consumed in a training process for effective implementation of artificial intelligence was desperately required, no method forming a function performing a particular task without any training process has been proposed.

Embodiments of the inventive concept may provide an electronic device capable of recognizing a visual stimulus from an image while reducing computing resources and time consumed in a training process for a deep artificial neural network and an operating method thereof.

Various example embodiments provide an electronic device for recognizing a visual stimulus based on spontaneous selective neural response of a deep artificial neural network and an operating method thereof.

An operating method of an electronic device according to various example embodiments may include measuring a response of a randomly-initialized neural network for an input image, and recognizing at least one visual stimulus from the input image, based on the measured response.

An electronic device according to various example embodiments may include a memory, and a processor configured to connect with the memory and execute at least one instruction stored in the memory, and the processor may be configured to measure a response of a randomly-initialized neural network for an input image, and recognize at least one visual stimulus from the input image, based on the measured response.

A non-transitory computer-readable storage medium according to various example embodiments may store a computer program, and the computer program may be configured to execute measuring a response of a randomly-initialized neural network for an input image, and recognizing at least one visual stimulus from the input image, based on the measured response.

According to various example embodiments, an electronic device may perform a visual cognitive function with only an untrained randomly-initialized neural network. At this time, the electronic device may recognize a visual stimulus of an image, based on a response of the randomly-initialized neural network for the image. Therefore, since a training process for huge training data is unnecessary in the electronic device, computing resources and time consumed on performing a visual cognitive function by the electronic device may be reduced.

BRIEF DESCRIPTION OF THE DRAWINGS

These and/or other aspects, features, and advantages of the present disclosure will become apparent and more readily appreciated from the following description of embodiments, taken in conjunction with the accompanying drawings of which.

DETAILED DESCRIPTION

Hereinafter, some example embodiments will be described in detail with reference to the accompanying drawings.

Figure 1:
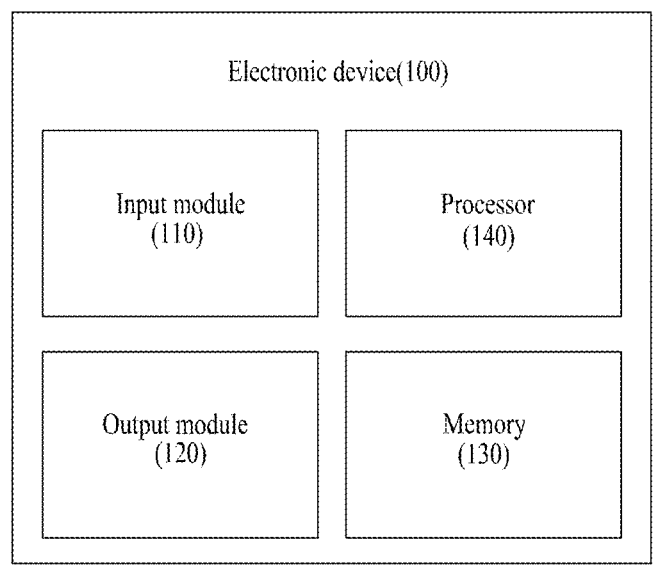
FIG. 1 is a drawing illustrating an electronic device according to various example embodiments.

FIG. 1 is a drawing illustrating an electronic device 100 according to various example embodiments.

Referring to FIG. 1, the electronic device 100 according to various example embodiments may include at least one of an input module 110, an output module 120, a memory 130 or a processor 140. In some embodiments, at least one of the components of the electronic device 100 may be omitted, and at least another one component may be added. In some embodiments, at least two of the components of the electronic device 100 may be implemented into one integrated circuit. For example, the electronic device 100 may include at least one of a smartphone, a mobile phone, a navigation, a computer, a laptop, a terminal for digital broadcasting, a PDA (Personal Digital Assistants), a PMP (Portable Multimedia Player), a tablet PC, a game console, a wearable device, an IoT (Internet of Things) device, or a robot.

The input module 110 may input a signal to be used for at least one component of the electronic device 100. The input module 110 may include at least one of an input device configured for a user to directly input a signal to the electronic device 100, a camera device configured to photograph an external image of the electronic device 100, or a receiving device configured to receive a signal from an external device. For example, the input device may include at least one of a microphone, a mouse or a keyboard. In some embodiments, the input device may include at least one of a touch circuitry set to sense touch or a sensor circuitry set to measure force generated by touch. For example, the camera device may include at least one of a lens, at least one image sensor, an image signal processor or a flash.

The output module 120 may output a signal of the electronic device 100. The output module 120 may include at least one of a display device configured to visually display a signal, an audio device configured to output a signal in sound, or a transmitting device configured to transmit a signal to an external device. For example, the display device may include at least one of a display, a hologram device, or a projector. As an example, the display device may be assembled with at least one of the touch circuitry or sensor circuitry of the input device, and implemented in a touch screen. The audio device may include at least one of a speaker or a receiver.

According to one example embodiment, the receiving device and the transmitting device may be implemented in a communication module. The communication module may perform communication with an external device in the electronic device 100. The communication module may establish a channel between the electronic device 100 and the external device, and through the channel, perform communication with the external device. Here, the external device may include at least one of a satellite, a base station, a server, or another electronic device. The communication module may include at least one of a wire communication module or a wireless communication module. The wire communication module may connect to the external device with wire, and communicate over the wire. The wireless communication module may include at least one of a near field communication module or a long distance communication module. The near field communication module may communicate with the external device with a near field communication method. The near field communication method may include at least one of Bluetooth, WiFi direct, or IrDA (Infrared Data Association). The long distance communication module may communicate with the external device with a long distance communication method. Here, the long distance communication module may communicate with the external device through a network. For example, the network may include at least one of a cellular network, the Internet, or a computer network such as LAN (local area network) or WAN (wide area network).

The memory 130 may store various data used by at least one component of the electronic device 100. For example, the memory 130 may include at least one of volatile memory or nonvolatile memory. Data may include at least one program and input data or output data related thereto. The program may be stored in the memory 130 as software including at least one instruction, and include e.g., at least one of an operating system, middleware or an application.

The processor 140 may control at least one component of the electronic device 100 by executing the program of the memory 130. Through this, the processor 140 may perform a data process or operation. At this time, the processor 140 may execute the instruction stored in the memory 130.

According to various example embodiments, the processor 140 may measure a response of a randomly-initialized neural network for an input image. At this time, the processor 140 may include the randomly-initialized neural network, and measure the response of the randomly-initialized neural network for the input image. The randomly-initialized neural network may include multiple neural network units. Also, the neural network units may differently respond for the input image. Here, different information may be mapped on the neural network units, respectively. The information mapped on each neural network unit may indicate information for identifying a visual stimulus from the input image. For example, the information mapped on each neural network may indicate the numerosity of the visual stimulus. The processor 140 may measure responses of the neural network units for the input image, respectively. Here, the response intensities for the responses of the neural network units may be measured, respectively.

According to various example embodiments, the randomly-initialized neural network may include kernel in which weights are randomly arranged. According to an example embodiment, a randomly-initialized neural network 320 may be an untrained randomly-initialized neural network. The untrained randomly-initialized neural network may include kernel in which weights are not arranged as a result of training, and randomly arranged. According to another example embodiment, the randomly-initialized neural network may be generated from a trained neural network. In other words, the randomly-initialized neural network may be generated by randomly permuting weights in kernel in which the weights are arranged as a result of training. Through this, in the kernel of the randomly-initialized neural network, the weights may be permuted in a state that they have not been trained from the beginning.

According to one example embodiment, the neural network units of the randomly-initialized neural network may show number selectivity. The information mapped on each neural network unit may indicate information for identifying the visual stimulus for the input image, and each neural network unit may respond to the numerosity of the visual stimulus. Here, each neural network unit may respond to the numerosity of the visual stimulus regardless of the stimulus' size, shape, location in the input image, and the like.

According to various example embodiments, the processor 140 may recognize at least one visual stimulus from the input image, based on the response of the randomly-initialized neural network. At this time, the processor 140 may recognize at least one visual stimulus by comparing responses of the neural network units. Here, the processor 140 may compare response intensities for the responses of the neural network units. For example, the response intensities for the responses of the neural network units may be different from each other. Also, the processor 140 may determine maximum intensity among the response intensities, and determine a neural network unit responding with the maximum intensity. Through this, the processor 140 may recognize the visual stimulus, based on the information mapped on the neural network unit responding with the maximum intensity. For example, the processor 140 may estimate the numerosity of the visual stimulus included in the input image.

Figure 2:
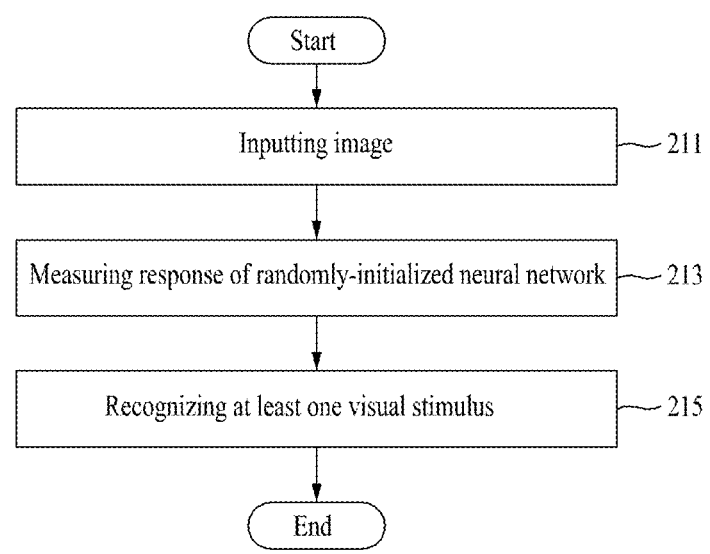
FIG. 2 is a drawing illustrating an operating method of an electronic device according to various example embodiments.
Figure 3:
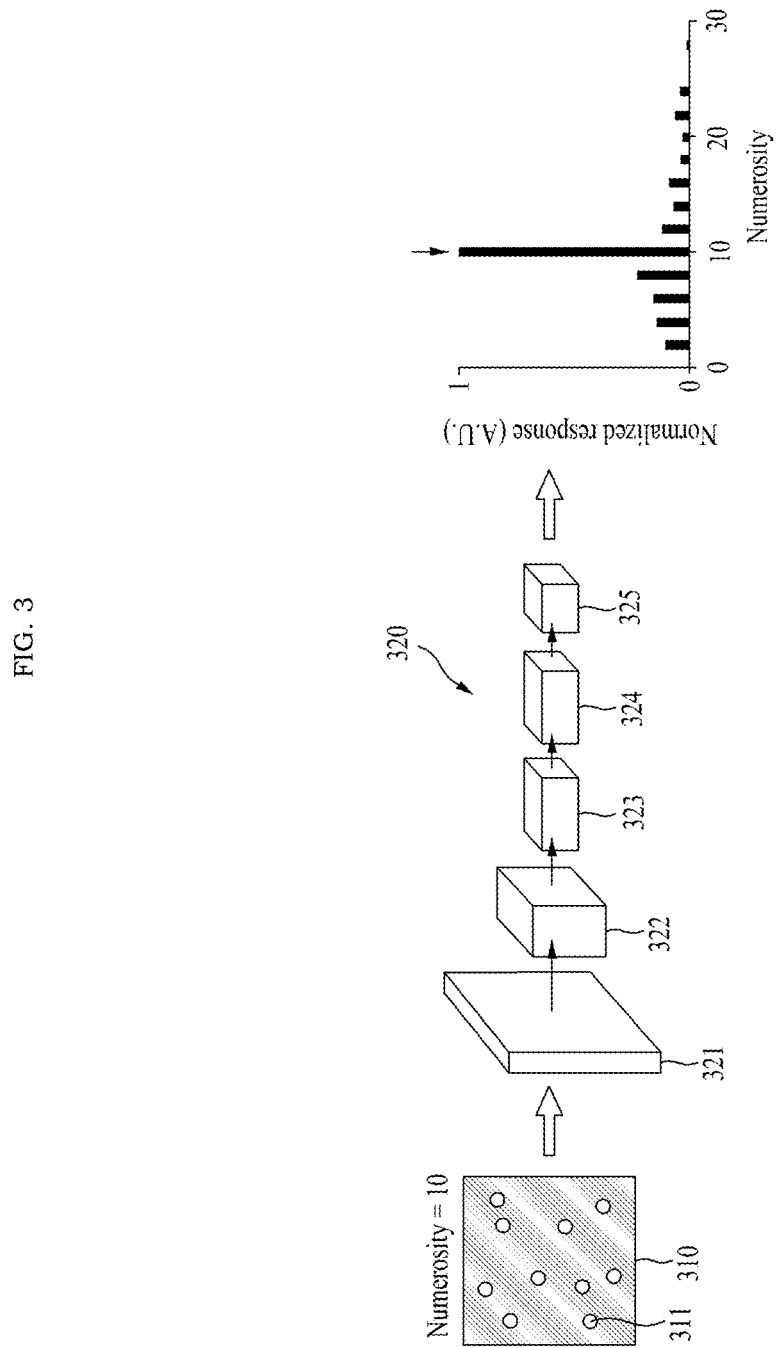
FIG. 3 is a drawing for describing an operating method of an electronic device according to various example embodiments.

FIG. 2 is a drawing illustrating an operating method of the electronic device 100 according to various example embodiments. FIG. 3 is a drawing for describing an operating method of the electronic device 100 according to various example embodiments. FIGS. 4A, 4B, 5, 6A, 6B, and 7 are drawings for describing the randomly-initialized neural network 320 of the electronic device 100 according to various example embodiments.

Referring to FIG. 2, the electronic device 100 may input an image 310 in Operation 211. The image 310 may include at least one visual stimulus 311. For example, as shown in FIG. 3, in the image 310, the numerosity of the visual stimulus 311 may be ten. At this time, the processor 140 may detect the input image 310. According to one example embodiment, the processor 140 may detect the input image 310 through the input module 110. As an example, the processor 140 may detect the input image 310 from the camera device by photographing an external image through the camera device. As another example, the processor 140 may detect the input image 310 from the communication module by receiving the image 310 from the external device through the communication module. According to another example embodiment, the processor 140 may detect the input image 310 from the memory 130 by reading the image 310 from the memory 130.

The electronic device 100 may measure a response of the randomly-initialized neural network 320 for the input image 310 in Operation 213. At this time, the processor 140 may include the randomly-initialized neural network 320, and measure the response of the randomly-initialized neural network 320 for the input image 310. The randomly-initialized neural network 320 may include multiple neural network units. Also, the neural network units may differently respond to the input image 310. Here, different information may be mapped on the neural network units, respectively. The information mapped on each neural network unit may indicate information for identifying the visual stimulus 311 from the input image 310. For example, the information mapped on each neural network unit may indicate the numerosity of the visual stimulus 311. The processor 140 may measure responses of the neural network units for the input image 310, respectively. Here, response intensities for the responses of the neural network units may be measured, respectively.

Figure 4A:
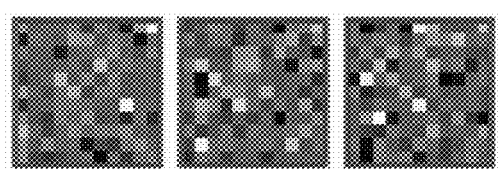
FIGS. 4A, 4B, 5, 6A, 6B, and 7 are drawings for describing a randomly-initialized neural network of an electronic device according to various example embodiments.
Figure 4B:
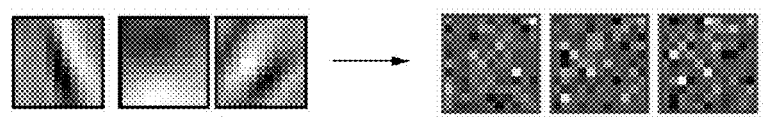

According to various example embodiments, the randomly-initialized neural network 320 may include kernel in which weights are randomly arranged. According to one example embodiment, the randomly-initialized neural network 320 may be the untrained randomly-initialized neural network 320. The untrained randomly-initialized neural network 320 may include kernel in which weights are not arranged as a result of training, and randomly arranged as shown in FIG. 4A. According to another example embodiment, the randomly-initialized neural network 320 may be generated from the trained neural network. In other words, the randomly-initialized neural network 320 may be generated by randomly permuting weights in kernel in which weights are arranged as a result of training as shown in FIG. 4B. Through this, in the kernel of the randomly-initialized neural network 320, weights may be permuted in a state that they have been untrained from the beginning.

Figure 5:
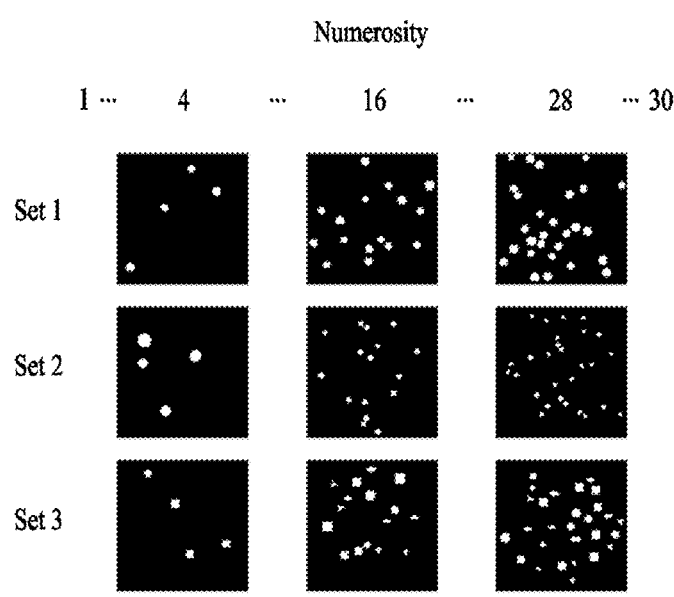
Figure 6A:
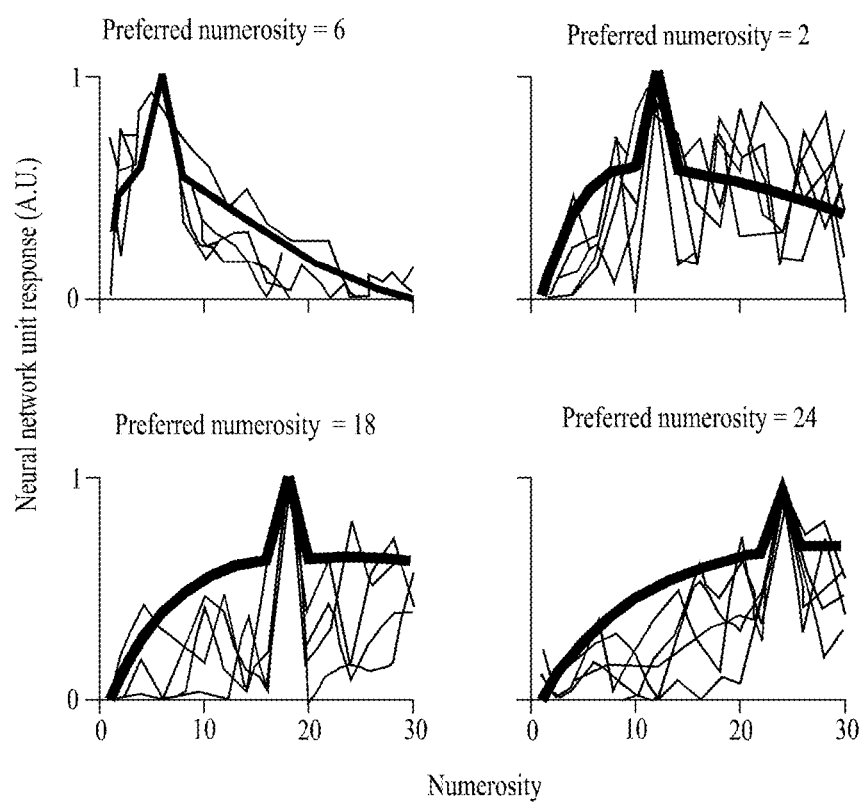
Figure 6B:
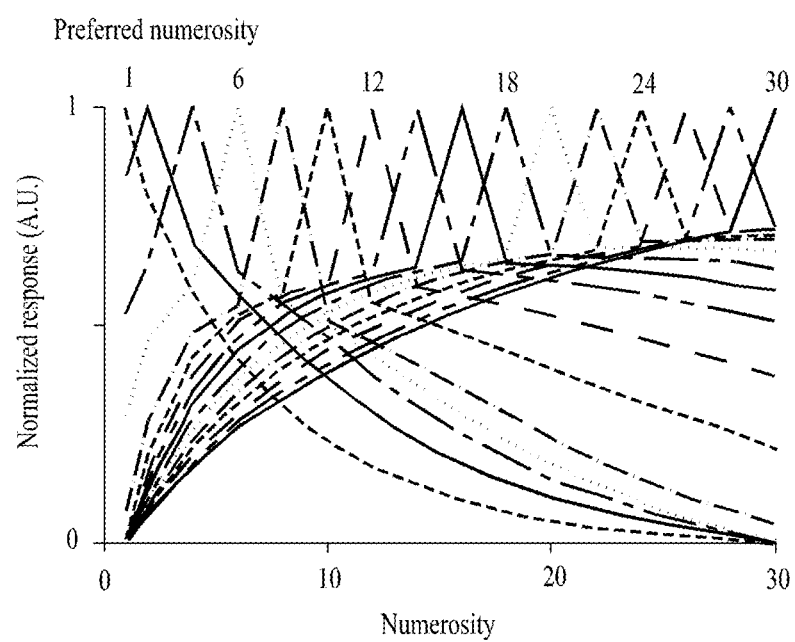

According to one example embodiment, the neural network units of the randomly-initialized neural network 320 may show number selectivity. The information mapped on each neural network unit may indicate information for identifying the visual stimulus from the input image 310, and each neural network unit may respond to the numerosity of the visual stimulus 311. Here, each neural network unit may respond to the numerosity of the visual stimulus 311 regardless of the visual stimulus 311's size, shape, location in the input image 310, and the like. For this, it may be verified based on images of Set 1, Set 2, and Set 3 as shown in FIG. 5. Set 1 may be configured with images having the same size and shape of the visual stimulus 311 and only different numerosity of the visual stimulus 311. Set 2 may be configured with images having the same shape of the visual stimulus 311 and different numerosity and size of the visual stimulus 311. Set 3 may be configured with images having different numerosity, size, and shape of the stimulus 311. For images of Set 1, Set 2, and Set 3, each neural network unit of the randomly-initialized neural network 320 may greatly respond to the numerosity of the visual stimulus 311 as shown in FIG. 6A. In other words, each neural network unit of the randomly-initialized neural network 320 may show number selectivity greatly responding to each numerosity of the visual stimulus 311 as shown in FIG. 6B.

Figure 7:
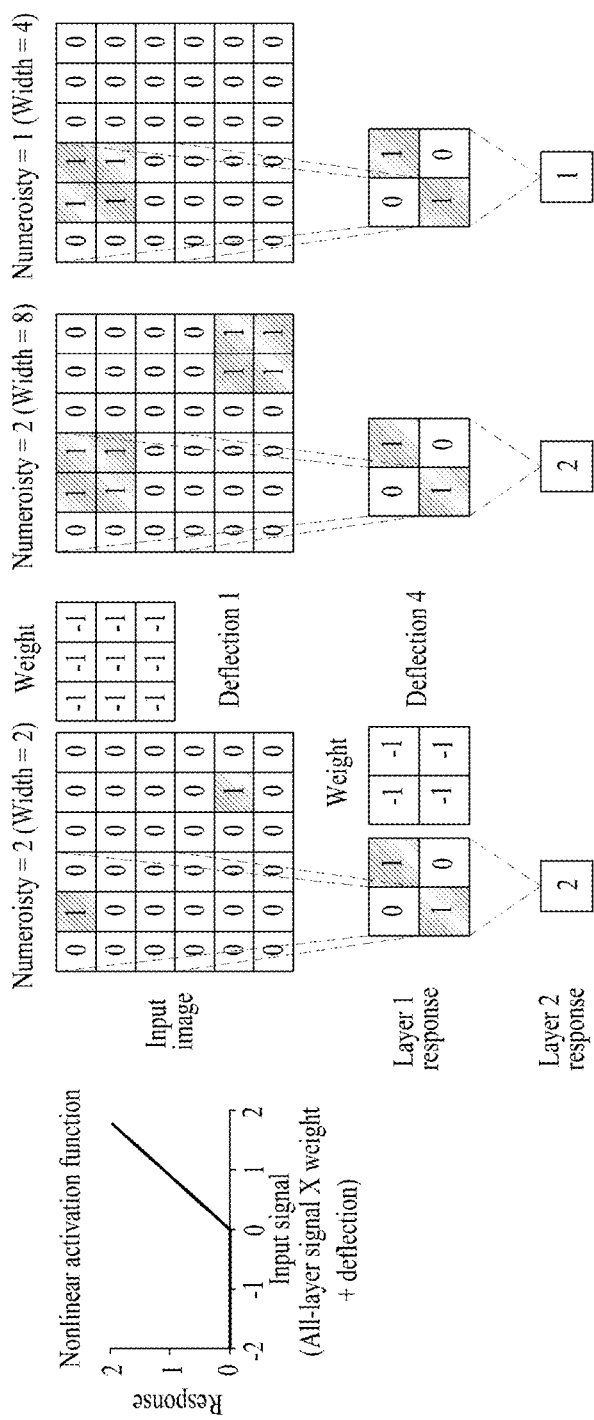

For example, the randomly-initialized neural network 320 may be implemented with a deep convolutional neural network including a plurality of convolutional layers 321, 322, 323, 324, 325, as shown in FIG. 3. As an example, the randomly-initialized neural network 320 may include five convolutional layers 321, 322, 323, 324, 325. In this case, the processor 140 may measure a response of the final convolutional layer 325 among the convolutional layers 321, 322, 323, 324, 325. Here, the convolutional layers 321, 322, 323, 324, 325 may be divided into a first convolutional layer 321 and at least one rest convolutional layer 322, 323, 324, 325. A response of the first convolutional layer 321 may be the response for the input image 310, and a response of the rest convolutional layer 322, 324, 325 may be obtained by the response of the previous convolutional layer 321, 322, 323, 324 and convolution of kernel, i.e., the kernel in which weights are randomly arranged. Through this, the processor 140 may measure the response of the final convolutional layer 325 among the convolutional layers 321, 322, 323, 324, 325 as the response of the randomly-initialized neural network 320. For example, the randomly-initialized neural network 320 may indicate number selectivity as shown in FIG. 7. In other words, each neural network unit of the randomly-initialized neural network 320 may respond to the numerosity of the visual stimulus 311 regardless of the visual stimulus 311's size, shape, location in the input image 310, and the like.

The electronic device 100 may recognize the at least one visual stimulus 311 from the input image 310, based on the response of the randomly-initialized neural network 320 in Operation 215. At this time, the processor 140 may recognize the at least one visual stimulus 311 by comparing responses of neural network units. Here, the processor 140 may compare response intensities for the responses of the neural network units. For example, as a graph shown in FIG. 3, the response intensities for the responses of the neural network units may be different. Also, the processor 140 may determine maximum intensity among the response intensities, and determine a neural network unit responding with the maximum intensity. Through this, the processor 140 may recognize the visual stimulus 311, based on information mapped on the neural network unit responding with the maximum intensity. For example, the processor 140 may estimate the numerosity of the visual stimulus 311 included in the input image 310 as ten, as the graph shown in FIG. 3.

Figure 8A:
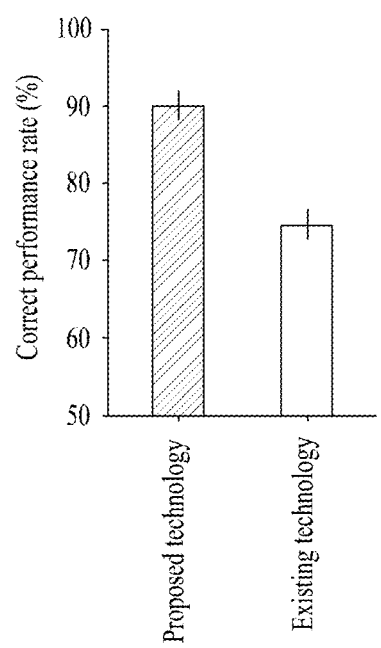
FIGS. 8A and 8B are drawings for describing operating effects of an electronic device according to various example embodiments.
Figure 8B:
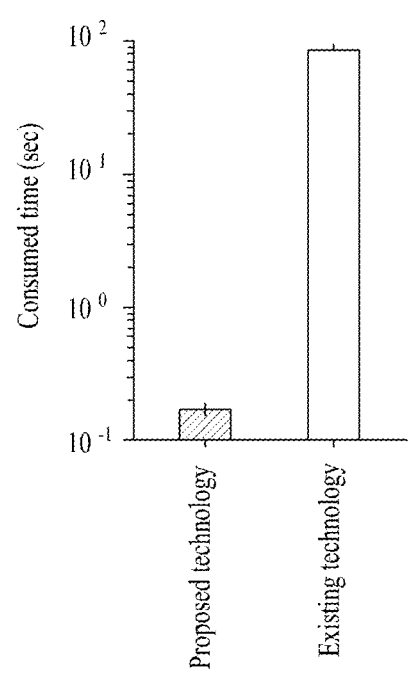

FIGS. 8A and 8B are drawings for describing operating effects of the electronic device 100 according to various example embodiments.

Referring to FIGS. 8A and 8B, according to the proposed technology, the numerosity of the visual stimulus 311 of the input image 310 by using the randomly-initialized neural network 320 is estimated by the electronic device 100 according to various example embodiments. Meanwhile, according to the existing technology, through training for the input image 310 by using the deep neural network, the numerosity of the visual stimulus 311 of the input image 310 is estimated. Comparing these, as shown in FIG. 8A, the correct performance rate for the numerosity of the visual stimulus 311 estimated from the input image 310 is higher in the proposed technology than in the existing technology.

Furthermore, as shown in FIG. 8B, the consumed time for estimating the numerosity of the visual stimulus 311 from the input image 310 is remarkably shorter in the proposed technology than in the existing technology. Therefore, when the electronic device 100 estimates the numerosity of the visual stimulus 311 of the input image 310 by using the randomly-initialized neural network 320, the accuracy may be improved, and the consumed time may be reduced.

According to various example embodiments, the electronic device 100 may perform a visual cognitive function with only the untrained randomly-initialized neural network 320. At this time, the electronic device 100 may recognize the visual stimulus 311 of the image 310, based on the response of the randomly-initialized neural network 320 for the image 310, not inputting the image 310 to the randomly-initialized neural network 320. Therefore, since a training process for huge training data is unnecessary in the electronic device 100, computing resources and time consumed on performing the visual cognitive function by the electronic device 100 may be reduced.

An operating method of the electronic device 100 according to various example embodiments may include measuring the response of the randomly-initialized neural network 320 for the input image 310, and recognizing the at least one visual stimulus 311 from the input image 310 based on the measured response.

According to various example embodiments, the randomly-initialized neural network 320 may include multiple neural network units.

According to various example embodiments, the measuring the response may include measuring responses of the neural network units for the input image 310, respectively.

According to various example embodiments, the recognizing the visual stimulus 311 may include determining neural network unit of maximum intensity among the measured responses, and recognizing the visual stimulus 311, based on information mapped on the determined neural network unit.

According to various example embodiments, the mapped information may indicate the numerosity of the visual stimulus 311.

According to various example embodiments, the recognizing the visual stimulus 311 may include estimating the numerosity for the visual stimulus 311.

According to various example embodiments, the randomly-initialized neural network 320 may include kernel in which weights are randomly arranged.

According to various example embodiments, the randomly-initialized neural network 320 may be generated by randomly permuting weights in kernel in which the weights are arranged as a result of training.

According to various example embodiments, the randomly-initialized neural network 320 may be configured with the plurality of convolutional layers 321, 322, 323, 324, 325.

According to various example embodiments, the measuring the response may include measuring the response of the final convolutional layer 325 among the convolutional layers 321, 322, 323, 324, 325.

According to various example embodiments, the convolutional layers 321, 322, 323, 324, 325 may be divided into the first convolutional layer 321 and at least one rest convolutional layer 322, 323, 324, 325.

According to various example embodiments, the response of the rest convolutional layer 322, 323, 324, 325 may be obtained by the response of the previous convolutional layer 321, 322, 323, 324 and convolution of the kernel.

The electronic device 100 according to various example embodiments may include the memory 130, and the processor 140 configured to connect with the memory 130 and execute at least one instruction stored in the memory 130.

According to various example embodiments, the processor 140 may be configured to measure the response of the randomly-initialized neural network 320 for the input image 310, and recognize at least one visual stimulus 311 from the input image 310, based on the measured response.

According to various example embodiments, the randomly-initialized neural network 320 may include multiple neural network units.

According to various example embodiments, the processor 140 may be configured to measure responses of the neural network units for the input image 310, respectively.

According to various example embodiments, the processor 140 may be configured to determine neural network unit of maximum intensity among the measured responses, and recognize the visual stimulus 311, based on information mapped on the determined neural network unit.

According to various example embodiments, the mapped information may indicate the numerosity of the visual stimulus 311.

According to various example embodiments, the processor 140 may be configured to estimate the numerosity of the visual stimulus 311.

According to various example embodiments, the randomly-initialized neural network 320 may include kernel in which weights are randomly arranged.

According to various example embodiments, the randomly-initialized neural network 320 may be generated by randomly permuting weights in kernel in which the weights are arranged as a result of training.

According to various example embodiments, the randomly-initialized neural network 320 may be configured with the plurality of convolutional layers 321, 322, 323, 324, 325.

According to various example embodiments, the processor 140 may be configured to measure the response of the final convolutional layer 325 among the convolutional layers 321, 322, 323, 324, 325.

According to various example embodiments, the convolutional layers 321, 322, 323, 324, 325 may be divided into the first convolutional layer 321 and at least one rest convolutional layer 322, 323, 324, 325.

According to various example embodiments, the response of the rest convolutional layer 322, 323, 324, 325 may be obtained by the response of the previous convolutional layer 321, 322, 323, 324 and convolution of the kernel.

The various example embodiments of this disclosure may be implemented as a computer program including at least one instruction stored in a readable storage medium (e.g. the memory 130) by a computer device (e.g., the electronic device 100). For example, a processor (e.g., the processor 140) of the computer device may call at least one of the stored at least one instruction from the storage medium, and execute it. This enables the computer device to be operated to perform at least one function according to the called at least one instruction. The at least one instruction may include a cord generated by a compiler or a cord which may be executed by an interpreter. The computer-readable storage medium may be provided in the form of a non-transitory storage medium. Here, 'non-transitory' only means that the storage medium is a tangible device and does not include a signal (e.g., electromagnetic wave), and this term does not distinguish between the cases that data is stored semipermanently on the storage medium and data is stored temporarily on the storage medium.

A computer program according to various example embodiments may execute measuring the response of the randomly-initialized neural network 320 for the input image 310, and recognizing at least one visual stimulus 311 from the input image 310, based on the measured response.

According to various example embodiments, the randomly-initialized neural network 320 may include multiple neural network units.

According to various example embodiments, the measuring the response may include measuring responses of the neural network units for the input image 310, respectively.

According to various example embodiments, the measuring the visual stimulus 311 may include determining neural network unit of maximum intensity among the measured responses, and recognizing the visual stimulus 311, based on information mapped on the determined neural network unit.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in the importance or the order. It is to be understood that if an element (e.g., a first element) is referred to as "coupled to (functionally or communicatively)" or "connected to" another element (e.g., a second element), it means that the element may be coupled with the other element directly, or via the other element (e.g., a third element).

The term "module" used in the disclosure may include a unit implemented in hardware, software, or firmware and may be interchangeably used with the terms logic, logical block, part, or circuit. The unit may be a minimum unit of an integrated part or may be a part thereof. The module may be a minimum unit for performing one or more functions or a part thereof. For example, the module may include an application-specific integrated circuit (ASIC).

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding component prior to the integration. According to various embodiments, operations performed by a module, a programming, or other components may be executed sequentially, in parallel, repeatedly, or in a heuristic method, or at least some operations may be executed in different sequences, omitted, or other operations may be added.

What is claimed is:

1. An operating method of an electronic device, comprising:
   measuring a response of a randomly-initialized neural network for an input image; and
   recognizing at least one visual stimulus from the input image, based on the measured response.

2. The method according to claim 1, wherein the randomly-initialized neural network comprises multiple neural network units, and
   wherein the measuring of the response measures responses of the neural network units for the input image, respectively.

3. The method according to claim 2, wherein the recognizing of the visual stimulus comprises:
   determining neural network unit of maximum intensity among the measured responses; and
   recognizing the visual stimulus, based on information mapped on the determined neural network unit.

4. The method according to claim 3, wherein the mapped information indicates the numerosity of the visual stimulus.

5. The method according to claim 4, wherein the recognizing of the visual stimulus comprises estimating the numerosity of the visual stimulus.

6. The method according to claim 1, wherein the randomly-initialized neural network comprises kernel in which weights are randomly arranged.

7. The method according to claim 1, wherein the randomly-initialized neural network is generated by randomly permuting weights in kernel in which the weights are arranged as a result of training.

8. The method according to claim 6, wherein the randomly-initialized neural network is configured with a plurality of convolutional layers, and
   wherein the measuring of the response comprises measuring a response of the final convolutional layer among the convolutional layers.

9. The method according to claim 8, wherein the convolutional layers are divided into a first convolutional layer and at least one rest convolutional layer, and
   wherein a response of the rest convolutional layer is obtained by a response of a previous convolutional layer and convolution of the kernel.

10. An electronic device, comprising:
    a memory; and
    a processor configured to connect with the memory and execute at least one instruction stored in the memory, and
    wherein the processor is configured to measure a response of a randomly-initialized neural network for an input image, and recognize at least one visual stimulus from the input image, based on the measured response.

11. The device of claim 10, wherein the randomly-initialized neural network is configured to comprise multiple neural network units, and
    wherein the processor is configured to measure responses of the neural network units for the input image, respectively.

12. The device of claim 11, wherein the processor is configured to determine neural network unit of maximum intensity among the measured responses, and recognize the visual stimulus, based on information mapped on the determined neural network unit.

13. The device of claim 12, wherein the mapped information indicates the numerosity of the visual stimulus.

14. The device of claim 13, wherein the processor is configured to estimate the numerosity of the visual stimulus.

15. The device of claim 10, wherein the randomly-initialized neural network comprises kernel in which weighs are randomly arranged.

16. The device of claim 10, wherein the randomly-initialized neural network is generated by randomly permuting weights in kernel in which the weights are arranged as a result of training.

17. The device of claim 15, wherein the randomly-initialized neural network is configured with a plurality of convolutional layers, and
wherein the processor is configured to measure a response of the final convolutional layer among the convolutional layers.

18. The device of claim 17, wherein the convolutional layers are divided into a first convolutional layer and at least one rest convolutional layer, and
wherein a response of the rest convolutional layer is obtained by a response of a previous convolutional layer and convolution of the kernel.

19. A non-transitory computer-readable storage medium storing a computer program, wherein the computer program is configured to execute
measuring a response of a randomly-initialized neural network for an input image; and
recognizing at least one visual stimulus from the input image, based on the measured response.

20. The non-transitory computer-readable storage medium according to claim 19, wherein the randomly-initialized neuronal network comprises multiple neural network units,
wherein the measuring of the response comprises measuring responses of the neural network units for the input image, respectively, and
wherein the recognizing of the visual stimulus comprises:
determining neural network unit of maximum intensity among the measured responses; and
recognizing the visual stimulus, based on information mapped on the determined neural network unit.

* * * * *